(12) United States Patent
Gandrothula et al.

(10) Patent No.: US 10,365,048 B2
(45) Date of Patent: Jul. 30, 2019

(54) MULTIPLY-WOUND TUBE, METHOD OF MANUFACTURING MULTIPLY-WOUND TUBE, AND DEVICE FOR MANUFACTURING MULTIPLY-WOUND TUBE

(71) Applicant: SANOH INDUSTRIAL CO., LTD., Tokyo (JP)

(72) Inventors: Srinivas Gandrothula, Ibaraki (JP); Takuma Endo, Ibaraki (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 61 days.

(21) Appl. No.: 15/750,237

(22) PCT Filed: Jul. 29, 2016

(86) PCT No.: PCT/JP2016/072305
§ 371 (c)(1),
(2) Date: Feb. 5, 2018

(87) PCT Pub. No.: WO2017/022663
PCT Pub. Date: Feb. 9, 2017

(65) Prior Publication Data
US 2018/0231334 A1    Aug. 16, 2018

(30) Foreign Application Priority Data

Aug. 6, 2015 (JP) .................................. 2015-156404

(51) Int. Cl.
*F28F 1/30* (2006.01)
*F28F 1/40* (2006.01)
(Continued)

(52) U.S. Cl.
CPC ................ *F28F 1/40* (2013.01); *B21C 37/08* (2013.01); *B21C 37/09* (2013.01); *B23K 1/00* (2013.01);
(Continued)

(58) Field of Classification Search
CPC .. B23K 26/354; B23K 26/359; B23K 26/355; B23K 1/00; B23K 1/0012; B23K 1/005;
(Continued)

(56) References Cited

U.S. PATENT DOCUMENTS

2015/0323260 A1* 11/2015 Greber .................. F28D 9/0068
165/164
2016/0209127 A1    7/2016 Goto et al.

FOREIGN PATENT DOCUMENTS

CN          1139596 A     1/1997
CN        103567638 A     2/2014
(Continued)

OTHER PUBLICATIONS

Extended European Search Report in EP Application No. 16832942.3 dated Jun. 25, 2018, 9 pages.
(Continued)

*Primary Examiner* — Davis D Hwu
(74) *Attorney, Agent, or Firm* — Marshall, Gerstein & Borun LLP

(57) ABSTRACT

A multiply-wound tube includes: a tube body formed by winding, into a roll, a metal plate comprising a core material layer made of a first metal material and a brazing material layer made of a second metal material having a lower melting point than the core material layer; and a joint portion that is formed at a portion of the metal plate that is wound in layers, wherein the portion of the metal plate that is
(Continued)

wound in layers is brazed together by the brazing material layer being melted by heat from a laser projected onto the tube body.

15 Claims, 11 Drawing Sheets

(51) Int. Cl.
| | |
|---|---|
| *F16L 9/16* | (2006.01) |
| *F28D 1/047* | (2006.01) |
| *B23K 26/354* | (2014.01) |
| *B21C 37/09* | (2006.01) |
| *B23K 1/005* | (2006.01) |
| *B23K 26/10* | (2006.01) |
| *B23K 1/00* | (2006.01) |
| *B23K 1/008* | (2006.01) |
| *B23K 26/00* | (2014.01) |
| *B23K 26/359* | (2014.01) |
| *B23K 26/352* | (2014.01) |
| *B21C 37/08* | (2006.01) |
| *B23P 15/26* | (2006.01) |
| *B23K 101/06* | (2006.01) |
| *B23K 101/14* | (2006.01) |

(52) U.S. Cl.
CPC .............. *B23K 1/005* (2013.01); *B23K 1/008* (2013.01); *B23K 1/0012* (2013.01); *B23K 1/0056* (2013.01); *B23K 26/0006* (2013.01); *B23K 26/106* (2013.01); *B23K 26/354* (2015.10); *B23K 26/355* (2018.08); *B23K 26/359* (2015.10); *B23P 15/26* (2013.01); *F16L 9/16* (2013.01); *F28D 1/047* (2013.01); *B23K 2101/06* (2018.08); *B23K 2101/14* (2018.08)

(58) Field of Classification Search
CPC .. B23K 1/0056; B23K 1/008; B23K 2101/06; B23K 2101/14; B21C 37/08; B21C 37/09; F28D 1/047; F28D 9/0068; F16L 9/16; B23P 15/26
USPC ......................................................... 165/182
See application file for complete search history.

(56) References Cited

FOREIGN PATENT DOCUMENTS

| | | |
|---|---|---|
| CN | 104567502 A | 4/2015 |
| EP | 1181993 A1 | 2/2002 |
| GB | 2297935 A | 8/1996 |
| JP | 10-29012 | 2/1998 |
| JP | 2005-279686 A | 10/2005 |
| JP | 2013-36099 A | 2/2013 |
| JP | 2015-49013 A | 3/2015 |
| WO | WO-03/047802 A1 | 6/2003 |
| WO | WO-2011/076402 A1 | 6/2011 |

OTHER PUBLICATIONS

Search Report in International Application No. PCT/JP2016/072305 dated Aug. 23, 2016, 2 pages.

Written Opinion in International Application No. PCT/JP2016/072305 dated Aug. 23, 2016, 4 pages.

Notice of Opinion of First Examination in CN Application No. 201680045815.9 dated Jan. 25, 2019, 15 pages.

* cited by examiner

MULTIPLY-WOUND TUBE, METHOD OF MANUFACTURING MULTIPLY-WOUND TUBE, AND DEVICE FOR MANUFACTURING MULTIPLY-WOUND TUBE

TECHNICAL FIELD

Aspects of the present invention relate to a multiply-wound tube, a method of manufacturing a multiply-wound tube, and a device for manufacturing a multiply-wound tube.

RELATED ART

Japanese Patent Application Laid-open (JP-A) No. 2015-049013 discloses a multiply-wound tube formed by winding into a tube a metal plate in which concavo-convexities are formed and then brazing together (joining together using a brazing material) the portion wound in layers.

SUMMARY OF INVENTION

Technical Problem

In this connection, in a typical multiply-wound tube (including also the multiply-wound tube disclosed in JP-A No. 2015-049013), the metal plate is wound into a tube and is thereafter put in a heating furnace to braze together the portion that is wound in layers. In this way, in a typical multiply-wound tube, a heating furnace is required for manufacture (manufacturing the tube), and it is difficult to reduce manufacturing costs because of the electrical power consumed by the heating furnace.

In consideration of the circumstances described above, it is a problem of aspects of the present invention to provide a multiply-wound tube, a method of manufacturing a multiply-wound tube, and a device for manufacturing a multiply-wound tube capable of reducing manufacturing costs.

Solution to Problem

A multiply-wound tube of a first aspect of the invention includes: a tube body formed by winding, into a roll, a metal plate comprising a core material layer made of a first metal material and a brazing material layer made of a second metal material having a lower melting point than the core material layer; and a joint portion that is formed at a portion of the metal plate that is wound in layers, wherein the portion of the metal plate that is wound in layers is brazed together by the brazing material layer being melted by heat from a laser projected onto the tube body.

In the multiply-wound tube of the first aspect, the portion of the metal plate that is wound in layers is brazed together by the brazing material layer being melted by the heat from the laser projected onto the tube body formed by winding the metal plate into a roll. Here, in this multiply-wound tube, heat from the laser is used, thereby brazing together the portion of the metal plate that is wound in layers in the tube body, so manufacturing costs can be reduced compared, for example, to a configuration where a heating furnace is used, thereby brazing together the portion of the metal plate that is wound in layers in the tube body.

A multiply-wound tube of a second aspect of the invention is the multiply-wound tube of the first aspect in which the laser is helically projected onto the tube body, and the portion of the metal plate that is wound in layers is entirely brazed together.

In the multiply-wound tube of the second aspect, the laser is helically projected onto the tube body, and the portion of the metal plate that is wound in layers is entirely brazed together, so the manufacturing time can be shortened compared, for example, to a configuration where the laser is repeatedly projected multiple times along the axial direction of the tube body to entirely braze together the portion of the metal plate that is wound in layers.

A multiply-wound tube of a third aspect of the invention is the multiply-wound tube of the first aspect or the second aspect in which a concavo-convex portion is formed at an inner surface or an outer surface of the tube body by the laser.

In the multiply-wound tube of the third aspect, the concavo-convex portion is formed at the inner surface or the outer surface of the tube body, so compared, for example, to a configuration where the concavo-convex portion is not formed at the inner surface or the outer surface of the tube body, the multiply-wound tube has superior heat transfer performance in a case where it is used as a heat transfer tube in a heat exchanger. Furthermore, in this multiply-wound tube, the laser is projected onto the tube body wound into a roll to form the concavo-convex portion at the inner surface or the outer surface of the tube body, so compared, for example, to a configuration where the tube body is formed by winding into a roll a metal plate in which the concavo-convex portion has been formed beforehand, a concavo-convex portion at which there is little deformation is obtained at the time of manufacture.

Moreover, in this multiply-wound tube, while the laser is projected onto the tube body wound into a roll to form the concavo-convex portion at the inner surface or the outer surface of the tube body, the portion of the metal plate that is wound in layers can be brazed together by the brazing material layer being melted by the heat from the laser transmitted through the metal plate, so manufacturing costs can be reduced compared, for example, to a configuration where the step of forming the concavo-convex portion at the inner surface or the outer surface of the tube body and the step of brazing together the portion of the metal plate that is wound in layers are separately carried out.

A multiply-wound tube of a fourth aspect of the invention is the multiply-wound tube of the third aspect in which the core material layer forms the inner surface of the tube body, and the concavo-convex portion is formed at the inner surface at a portion of the core material layer that is melted by projection of the laser onto the inner surface.

In the multiply-wound tube of the fourth aspect, the concavo-convex portion is formed at the inner surface of the tube body at the portion of the core material layer that is melted by projection of the laser onto the inner surface. Here, while the concavo-convex portion is formed by projection of the laser onto the inner surface of the tube body, the portion of the metal plate that is wound in layers can be brazed together by the brazing material layer being melted by the heat from the laser transmitted through the metal plate, so manufacturing costs can be reduced compared, for example, to a configuration where the step of forming the concavo-convex portion at the inner surface of the tube body and the step of brazing together the portion of the metal plate that is wound in layers is separately carried out.

Furthermore, in this multiply-wound tube, the concavo-convex portion is formed at the inner surface of the tube body, so in a case where the multiply-wound tube is used as a heat transfer tube in a heat exchanger, for example, the heat of the fluid (heat medium) flowing inside the tube body can be efficiently transmitted to the tube body.

A multiply-wound tube of a fifth aspect of the invention is the multiply-wound tube of the third aspect in which the core material layer forms the outer surface of the tube body, and the concavo-convex portion is formed at the outer surface at a portion of the core material layer that is melted by projection of the laser onto the outer surface.

In the multiply-wound tube of the fifth aspect, the concavo-convex portion is formed at the outer surface of the tube body at the portion of the core material layer that is melted by projection of the laser onto the outer surface. Here, in this multiply-wound tube, while the concavo-convex portion is formed by projection of the laser onto the outer surface of the tube body, the portion of the metal plate that is wound in layers can be brazed together by the brazing material layer being melted by the heat from the laser transmitted through the core material layer, so manufacturing costs can be reduced compared, for example, to a configuration where the step of forming the concavo-convex portion at the outer surface of the tube body and the step of brazing together the portion of the metal plate that is wound in layers is separately carried out.

Furthermore, in this multiply-wound tube, the concavo-convex portion is formed at the outer surface of the tube body, so in a case where the multiply-wound tube is used as a heat transfer tube in a heat exchanger, for example, the heat of the fluid (heat medium) flowing inside the tube body can be efficiently released via the tube body to the outside.

A multiply-wound tube of a sixth aspect of the invention is the multiply-wound tube of any one of the first aspect to the fifth aspect in which an outer surface of the tube body is covered with a cover member made of a resin material, and the cover member is adhered to the outer surface as a result of a contact surface of the cover member in contact with the tube body being melted by the heat from the laser projected onto the tube body.

In the multiply-wound tube of the sixth aspect, the outer surface of the tube body is covered with the cover member, so the durability of the tube body is improved compared, for example, to a configuration where the outer surface of the tube body is exposed to the outside. Furthermore, the contact surface of the cover member is melted by the heat from the laser projected onto the tube body such that the cover member and the outer surface of the tube body are adhered to together, so the strength of adhesion between the cover member and the tube body is improved.

A method of manufacturing a multiply-wound tube of a seventh aspect of the invention includes: forming a tube body by winding, into a roll, a metal plate comprising a core material layer made of a first metal material and a brazing material layer made of a second metal material having a lower melting point than the core material layer; and projecting a laser onto the tube body such that the brazing material layer is melted by heat from the laser, thereby brazing together portion of the metal plate that is wound in layers.

In the method of manufacturing a multiply-wound tube of the seventh aspect, the laser is projected onto the tube body formed by winding the metal plate into a roll such that the brazing material layer is melted by the heat from the laser, thereby brazing together the portion of the metal plate that is wound in layers. Here, in this method of manufacturing a multiply-wound tube, heat from the laser is used, thereby brazing together the portion of the metal plate that is wound in layers in the tube body, so manufacturing costs can be reduced compared, for example, to a configuration where a heating furnace is used, thereby brazing together the portion of the metal plate that is wound in layers in the tube body.

A method of manufacturing a multiply-wound tube of an eighth aspect of the invention is the method of manufacturing a multiply-wound tube of the seventh aspect, further comprising projecting the laser onto the tube body helically such that regions of the brazing material layer being melted by the heat from the laser overlap each other.

In the method of manufacturing a multiply-wound tube of the eighth aspect, the laser onto the tube body helically such that regions of the brazing material layer being melted by the heat from the laser overlap each other, so the portion of the metal plate that is wound in layers is entirely brazed together. Furthermore, in this method of manufacturing a multiply-wound tube, the manufacturing time can be shortened compared, for example, to a configuration where the laser is repeatedly projected multiple times along the axial direction of the tube body to entirely braze together the portion of the metal plate that is wound in layers.

A method of manufacturing a multiply-wound tube of a ninth aspect of the invention is the method of manufacturing a multiply-wound tube of the seventh aspect or the eighth aspect further comprising projecting the laser onto the tube body so as to form a concavo-convex portion at an inner surface or an outer surface of the tube body.

In the method of manufacturing a multiply-wound tube of the ninth aspect, the laser onto the tube body wound into a roll to form the concavo-convex portion at the inner surface or the outer surface of the tube body, and the brazing material layer is melted by the heat from the laser transmitted through the metal plate, thereby brazing together the portion of the metal plate that is wound in layers. For this reason, in this method of manufacturing a multiply-wound tube, manufacturing costs can be reduced compared, for example, to a configuration where the step of forming the concavo-convex portion at the inner surface or the outer surface of the tube body and the step of brazing together the portion of the metal plate that is wound in layers is separately carried out.

Furthermore, in this method of manufacturing a multiply-wound tube, the laser onto the tube body wound into a roll to form the concavo-convex portion at the inner surface or the outer surface of the tube body, so compared, for example, to a configuration where the tube body is formed by winding into a roll a metal plate in which the concavo-convex portion has been formed beforehand, a concavo-convex portion at which there is little deformation can be formed at the tube body at the time of manufacture.

Furthermore, in a case where the multiply-wound tube manufactured by this method of manufacturing a multiply-wound tube is used as a heat transfer tube in a heat exchanger, for example, heat transfer performance is improved because the concavo-convex portion is formed at the inner surface or the outer surface of the tube body.

A method of manufacturing a multiply-wound tube of a tenth aspect of the invention is the method of manufacturing a multiply-wound tube of the ninth aspect further comprising, forming the tube body by winding the metal plate into a roll such that the core material layer forms the inner surface of the tube body, and projecting the laser onto the inner surface such that the core material layer is melted by the heat from the laser to form the concavo-convex portion at the inner surface, and the brazing material layer is melted by the heat from the laser transmitted through the core material layer, thereby brazing together the portion of the metal plate that is wound in layers.

In the method of manufacturing a multiply-wound tube of the tenth aspect, first the tube body by winding the metal plate into a roll such that the core material layer forms the inner surface of the tube body. Next, the laser is projected onto the inner surface such that the core material layer is melted by the heat from the laser to form the concavo-convex portion at the inner surface, and the brazing material layer is melted by the heat from the laser transmitted through the core material layer, thereby brazing together the portion of the metal plate that is wound in layers. For this reason, in this method of manufacturing a multiply-wound tube, manufacturing costs can be reduced compared, for example, to a configuration where the step of forming the concavo-convex portion at the inner surface of the tube body and the step of brazing together the portion of the metal plate that is wound in layers is separately carried out.

Furthermore, in a case where the multiply-wound tube manufactured by this method of manufacturing a multiply-wound tube is used as a heat transfer tube in a heat exchanger, for example, the heat of the fluid (heat medium) flowing inside can be efficiently transmitted to the tube body.

A method of manufacturing a multiply-wound tube of an eleventh aspect of the invention is the method of manufacturing a multiply-wound tube of the ninth aspect further comprising. forming the tube body by winding the metal plate into a roll such that the core material layer forms the outer surface of the tube body, and projecting the laser onto the outer surface such that the core material layer is melted by the heat from the laser to form the concavo-convex portion at the outer surface, and the brazing material layer is melted by the heat from the laser transmitted through the core material layer, thereby brazing together the portion of the metal plate that is wound in layers.

In the method of manufacturing a multiply-wound tube of the eleventh aspect, first the tube body is formed by winding the metal plate into a roll such that the core material layer forms the outer surface of the tube body. Next, the laser is projected onto the outer surface such that the core material layer is melted by the heat from the laser to form the concavo-convex portion at the outer surface of the tube body, and the brazing material layer is melted by the heat from the laser transmitted through the core material layer, thereby brazing together the portion of the metal plate that is wound in layers. For this reason, in this method of manufacturing a multiply-wound tube, manufacturing costs can be reduced compared, for example, to a configuration where the step of forming the concavo-convex portion at the outer surface of the tube body and the step of brazing together the portion of the metal plate that is wound in layers is separately carried out.

Furthermore, in a case where the multiply-wound tube manufactured by this method of manufacturing a multiply-wound tube is used as a heat transfer tube in a heat exchanger, for example, the heat of the fluid (heat medium) flowing inside the tube body can be efficiently released via the tube body to the outside.

A method of manufacturing a multiply-wound tube of a twelfth aspect of the invention is the method of manufacturing a multiply-wound tube of any one of the seventh aspect to the eleventh aspect in which the laser is projected onto the tube body after an outer surface of the tube body has been covered, or while the outer surface of the tube body is being covered, with a cover member made of a resin material, such that the brazing material layer is melted by the heat from the laser, thereby brazing together the portion of the metal plate that is wound in layers, and a contact surface of the cover member in contact with the tube body is melted by the heat from the laser transmitted through the metal plate such that the cover member and the outer surface are adhered to together.

In the method of manufacturing a multiply-wound tube of the twelfth aspect, the laser is projected onto the tube body after the outer surface of the tube body has been covered, or while the outer surface of the tube body is being covered, with the cover member made of a resin material such that the brazing material layer is melted by the heat from the laser, thereby brazing together the portion of the metal plate that is wound in layers, and the contact surface of the cover member in contact with the tube body is melted by the heat from the laser transmitted through the metal plate such that the cover member and the outer surface of the tube body are adhered to together. For this reason, in this method of manufacturing a multiply-wound tube, manufacturing costs can be reduced compared, for example, to a configuration where the step of brazing together the portion of the metal plate that is wound in layers in the tube body and the step of adhering the cover member to the outer surface of the tube body using an adhesive are separately carried out.

Furthermore, in the multiply-wound tube manufactured by this method of manufacturing a multiply-wound tube, the outer surface of the tube body is covered with the cover member, so the durability of the tube body is improved. Moreover, in this multiply-wound tube, the contact surface of the cover member is melted to adhere the cover member and the outer surface of the tube body to each other, so the strength of adhesion between the cover member and the tube body is improved.

A device for manufacturing a multiply-wound tube of a thirteenth aspect of the invention includes: a forming device that forms a tube body by winding, into a roll, a metal plate comprising include a core material layer made of a first metal material and a brazing material layer made of a second metal material having a lower melting point than the core material layer; and a laser device that projects a laser onto the tube body to melt the brazing material layer with heat from the laser.

In the device for manufacturing a multiply-wound tube of the thirteenth aspect, first the metal plate is wound into a roll by the forming device such that the tube body is formed. Next, the laser is projected onto the tube body by the laser device such that the brazing material layer is melted by heat from the laser, thereby brazing together the portion of the metal plate that is wound in layers. In this way is the multiply-wound tube having the tube body manufactured. Here, in this device for manufacturing a multiply-wound tube, heat from the laser is used, thereby brazing together the portion of the metal plate that is wound in layers in the tube body, so manufacturing costs can be reduced compared, for example, to a configuration where a heating furnace is used, thereby brazing together the portion of the metal plate that is wound in layers in the tube body.

A device for manufacturing a multiply-wound tube of a fourteenth aspect of the invention is the device for manufacturing a multiply-wound tube of the thirteenth aspect in which the forming device is equipped with a cylindrical cored rod around which the metal plate is wound into a roll, and the laser device is equipped with a laser projecting component that is provided at a distal end portion side of the cored rod and projects the laser onto an inner surface of the tube body.

In the device for manufacturing a multiply-wound tube of the fourteenth aspect, the laser projecting component is provided at the distal end portion side of the cored rod around which the metal plate is wound into a roll, so the relative positions of the laser projecting component and the tube body are stable.

A device for manufacturing a multiply-wound tube of a fifteenth aspect of the invention is the device for manufacturing a multiply-wound tube of the fourteenth aspect in which the laser projecting component rotates about an axis of the cored rod and projects the laser onto the inner surface of the tube body.

In the device for manufacturing a multiply-wound tube of the fifteenth aspect, the laser projecting component rotates about the axis of the cored rod and projects the laser onto the inner surface of the tube body, so compared, for example, to a configuration where the laser projecting component does not rotate about the axis of the cored rod, it becomes possible to project, with a simple configuration, the laser all the way around the inner surface of the tube body.

Advantageous Effects of Invention

As described above, according to the aspects of the invention, a multiply-wound tube, a method of manufacturing a multiply-wound tube, and a device for manufacturing a multiply-wound tube capable of reducing manufacturing costs can be provided.

DESCRIPTION OF EMBODIMENTS

A multiply-wound tube, a method of manufacturing a multiply-wound tube, and a device for manufacturing a multiply-wound tube pertaining to embodiments of the invention will be described below with reference to the drawings.

First Embodiment

Figure 2:
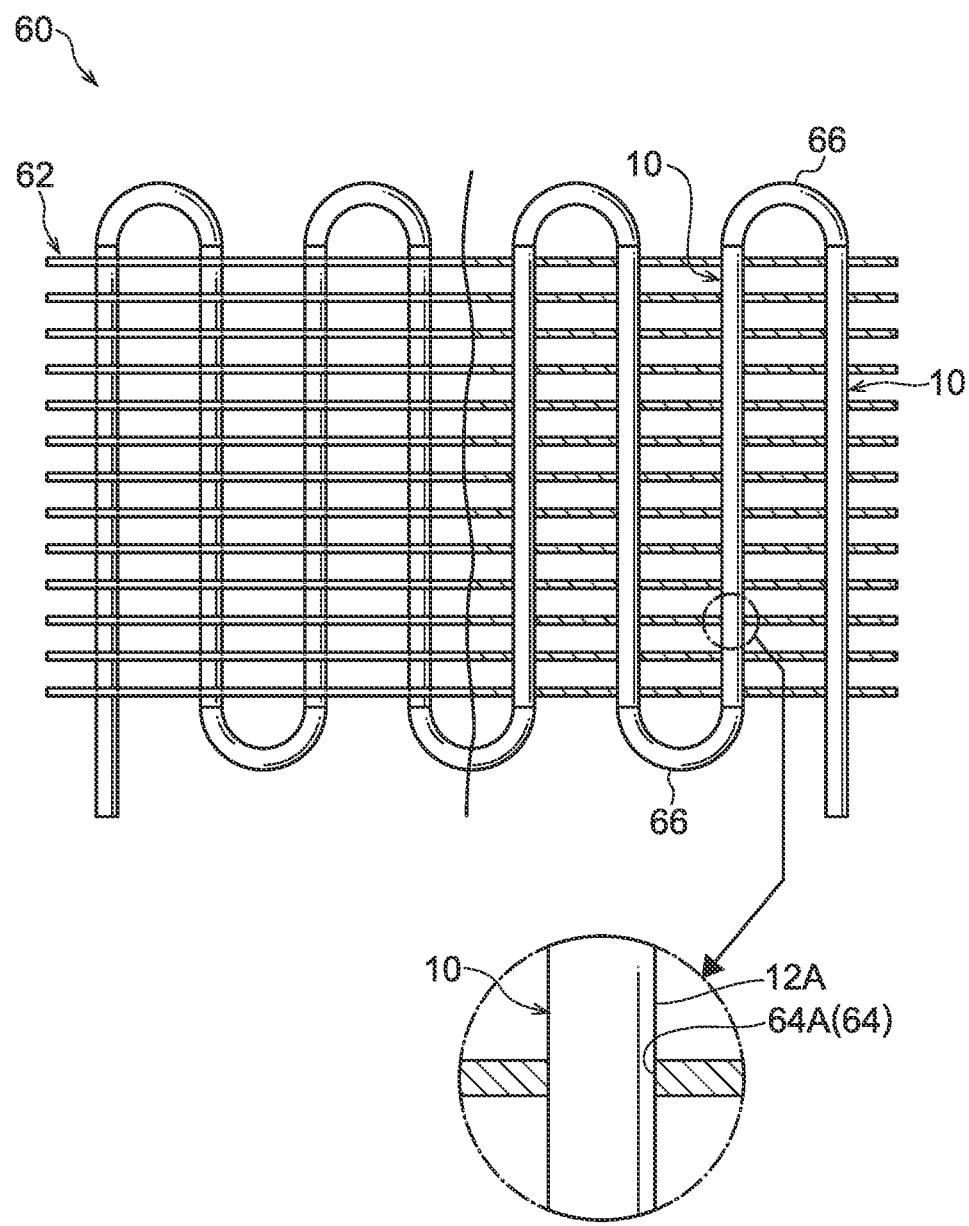
FIG. 2 is a front view of a heat exchanger using the multiply-wound tube of the first embodiment, and shows part of a fin in cross section.

First, a multiply-wound tube, a method of manufacturing a multiply-wound tube, and a device for manufacturing a multiply-wound tube pertaining to a first embodiment of the invention will be described. As shown in FIG. 2, a multiply-wound tube 10 of the present embodiment is used as a heat transfer tube in a heat exchanger 60 installed in an air conditioner. The heat exchanger 60 is used to exchange the heat of a fluid (a heat medium) used in a heat exchange unit of the air conditioner. It will be noted that the embodiments of the invention are not limited to this configuration; the heat exchanger 60 may also be installed in a refrigerator, for example, and used to cool refrigerant (an example of a fluid) used in a cooling unit of the refrigerator, and the heat exchanger 60 may also be installed in an automobile and used to cool cooling water (an example of a fluid) in an engine cooling system. That is to say, the heat exchanger 60 of the present embodiment may be applied to any device so long as it is for the purpose of exchanging the heat of a fluid.

The heat exchanger 60 of the present embodiment is equipped with the multiply-wound tube 10 and fins 62. The fins 62 comprise a metal material (e.g., aluminum) formed in a plate shape (so-called metal plates), and through holes 64 running through the fins 62 in their plate thickness direction are formed in the fins 62. The multiply-wound tube 10 is inserted into the through holes 64, and an outer surface 12A of the multiply-wound tube 10 is joined to hole walls 64A of the through holes 64. Because of this joining, heat is efficiently transmitted from the multiply-wound tube 10 to the fins 62 and from the fins 62 to the multiply-wound tube 10.

Next, the heat exchanger 60 will be described in detail. As shown in FIG. 2, in the heat exchanger 60, a plurality of the multiply-wound tubes 10 are lined up parallel to each other, and end portions of the multiply-wound tubes 10 adjacent to each other are coupled to each other by U-shaped couplings 66. Furthermore, the multiply-wound tubes 10 are inserted into the through holes 64 in the plural fins 62 which are lined up and spaced apart from each other, and the outer surfaces 12A of the multiply-wound tubes 10 are joined to the hole walls 64A of the through holes 64.

Next, the multiply-wound tube 10 of the present embodiment will be described.

Figure 1:
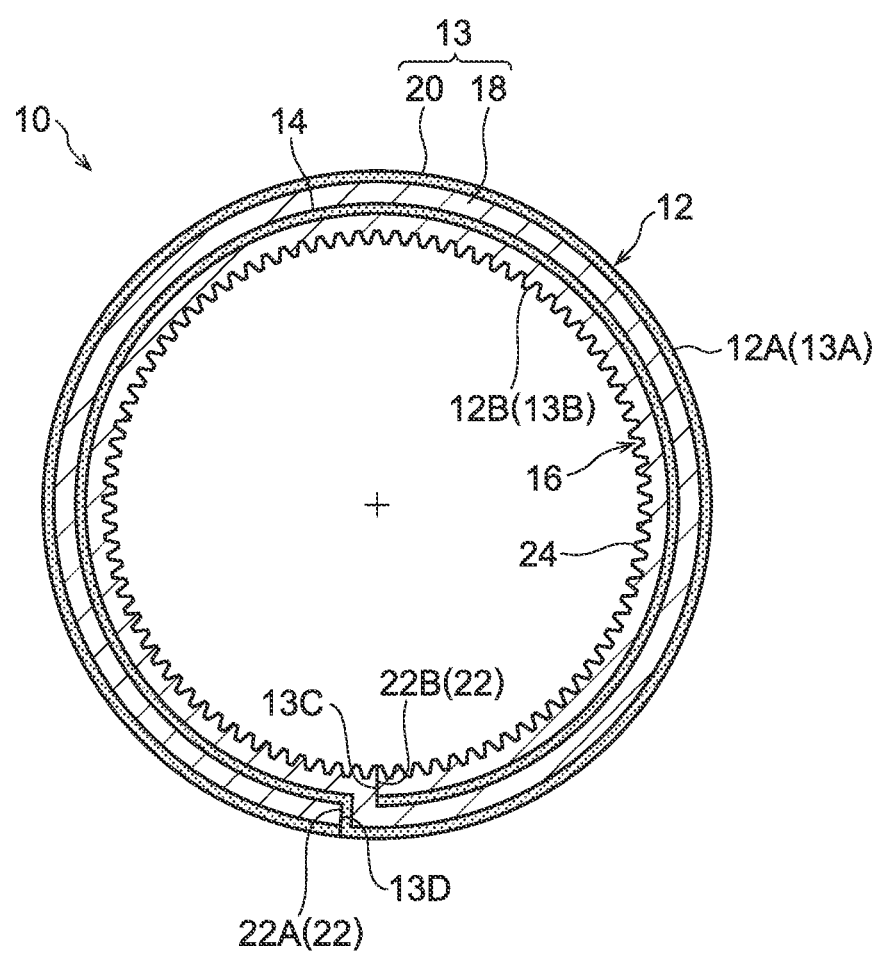
FIG. 1 is a sectional view along a direction perpendicular to an axis of a multiply-wound tube of a first embodiment.

As shown in FIG. 1, the multiply-wound tube 10 has a tube body 12, which is formed by winding a metal plate 13 into a roll, and a joint portion 14, at which portion of the metal plate 13 that is wound in layers is joined to each other by brazing. A concavo-convex portion 16 for promoting heat exchange is formed at an inner surface 12B of the tube body 12.

The metal plate 13 is comprising a core material layer 18 made of a metal material and a brazing material layer 20 made of a metal material having a lower melting point than the core material layer 18. Specifically, the metal plate 13 is a plate in which the brazing material layer 20 is bonded to the core material layer 18, that is, a clad plate.

Furthermore, in the present embodiment, the metal plate 13 is configured by aluminum. Specifically, the metal plate 13 is formed by bonding the brazing material layer 20 made of aluminum alloy (e.g., aluminum containing silicon (A4343, for example)) to the core material layer 18 made of pure aluminum or aluminum alloy (e.g., aluminum containing manganese (A3003, for example)).

It will be noted that although in the present embodiment the metal plate 13 is configured by aluminum, the embodiments of the invention are not limited to this configuration. For example, the metal plate 13 may also be configured by a metal material such as copper or iron.

The tube body 12 is formed by winding a single metal plate 13 into a roll such that the inner surface 12B is formed by the core material layer 18 and the outer surface 12A is formed by the brazing material layer 20. Furthermore, the portion of the metal plate 13 that is wound in layers in the tube body 12 are brazed together by the brazing material layer 20 being melted by heat from a laser L projected onto the tube body 12. Specifically, the portion of the metal plate 13 that is wound in layers is brazed together as a result of the brazing material layer 20 being melted by the heat from a laser L projected in order to form the concavo-convex portion 16 in the inner surface 12B of the tube body 12.

It will be noted that in the present embodiment the joint portion 14 is where the portion of the metal plate 13 that is wound in layers have been brazed together by the brazing material layer 20.

Furthermore, in the present embodiment the portion of the metal plate 13 that is wound in layers is entirely brazed together by projecting the laser L onto the inner surface 12B of the tube body 12 helically about the axial direction of the tube body 12. It will be noted that the embodiments of the invention are not limited to this configuration, and, for example, it is also alright if some of the portion of the metal plate 13 that is wound in layers is not brazed.

Furthermore, the multiply-wound tube 10 of the present embodiment is a doubly wound tube in which the metal plate 13 is doubly wound. Specifically, the tube body 12 configuring the multiply-wound tube 10 is formed by winding the metal plate 13 in such a way that it becomes doubled. It will be noted that the embodiments of the invention are not limited to this configuration, and, for example, the tube body 12 configuring the multiply-wound tube 10 may also be formed by winding the metal plate 13 in such a way that it becomes tripled or more.

Furthermore, one section of an inner surface 13B of the metal plate 13 wound into a roll is configured to be the inner surface 12B of the tube body 12, and one section of an outer surface 13A of the metal plate 13 wound into a roll is configured to be the outer surface 12A of the tube body 12.

In the inner surface 13B of the metal plate 13 wound into a roll, an inner step surface 22B is formed between a winding direction inner end portion (in other words, an inner peripheral end portion) 13C and a winding direction outer end portion (in other words, an outer peripheral end portion) 13D. The end portion 13C of the metal plate 13 wound into a roll faces and is brazed (brazed by the metal material configuring the brazing material layer 20) to the inner step surface 22B. Furthermore, the height of the inner step surface 22B is configured to be substantially the same as the plate thickness of the metal plate 13.

In the outer surface 13A of the metal plate 13 wound into a roll, an outer step surface 22A is formed between the end portion 13C and the end portion 13D. The end portion 13D of the metal plate 13 wound into a roll faces and is brazed (brazed by the metal material configuring the brazing material layer 20) to the outer step surface 22A. Furthermore, the height of the outer step surface 22A is configured to be substantially the same as the plate thickness of the metal plate 13.

It will be noted that in the present embodiment a step portion 22 is formed by bending in the shape of a crank the middle section (the middle section in the winding direction) between the end portion 13C and the end portion 13D of the metal plate 13 wound into a roll, with one surface of the step portion 22 forming the inner step surface 22B and with the other surface of the step portion 22 forming the outer step surface 22A. Furthermore, in the present embodiment the plate thickness of the metal plate 13 is substantially constant. For this reason, the outer diameter and the inner diameter of the tube body 12 (the multiply-wound tube 10) are circumferentially substantially uniform.

The concavo-convex portion 16 is formed at the part of the core material layer 18 melted by projection of the laser L onto the inner surface 12B of the tube body 12. The concavo-convex portion 16 of the present embodiment is configured by plural projections 24 formed at the inner surface 12B. The projections 24 are formed at the inner surface 12B of the tube body 12 in such a way as to be spaced apart from each other in the circumferential direction of the tube body 12 and spaced apart from each other also in the axial direction of the tube body 12.

Next, a manufacturing device 30 for manufacturing the multiply-wound tube 10 of the present embodiment will be described.

As shown in FIG. 3 to FIG. 6, the manufacturing device 30 of the present embodiment is a device for manufacturing the multiply-wound tube 10, and is equipped with a forming device 32 and a laser device 40.

Figure 3:
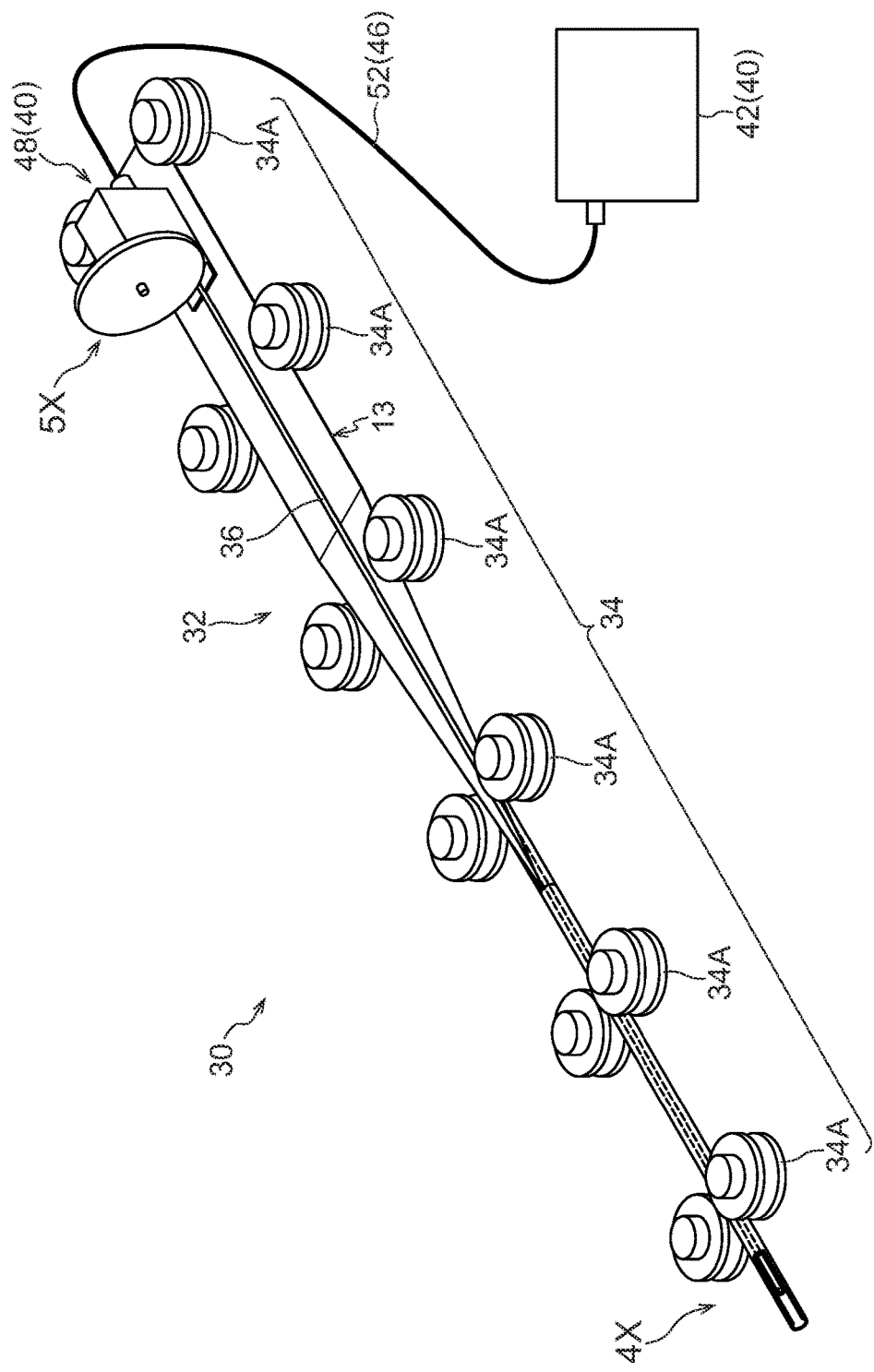
FIG. 3 is a general perspective view of a device for manufacturing a multiply-wound tube of the first embodiment.

As shown in FIG. 3, the forming device 32 is a device for winding the metal plate 13 into a roll—that is, roll-forming the metal plate 13—to form the tube body 12. The forming device 32 is equipped with a support table—not shown in the drawings—on which the metal plate 13 is disposed, a forming roll group 34 that is attached to the support table and is for winding the metal plate 13 into a roll to form the metal plate 13 into a predetermined tube shape, and a mandrel 36 that is supported, in such a way that it may freely rotate, by a later-described rotating device 48 installed on the support table and around which the metal plate 13 becomes wound. It will be noted that the mandrel 36 of the present embodiment is an example of a cored rod of the invention.

The forming role group 34 comprises plural forming rolls 34A disposed so as to be spaced apart from each other in the conveyance direction of the metal plate 13, and the forming rolls 34A are set to gradually curve the metal plate 13 and wind it into a roll around the mandrel 36 as the metal plate 13 is conveyed.

The mandrel 36 is cylindrical, and a through hole is formed in the mandrel 36 along its central axis. An optical fiber 56 described later is disposed in the through hole. It will be noted that in the present embodiment a glass fiber is used as the optical fiber 56.

Figure 4:
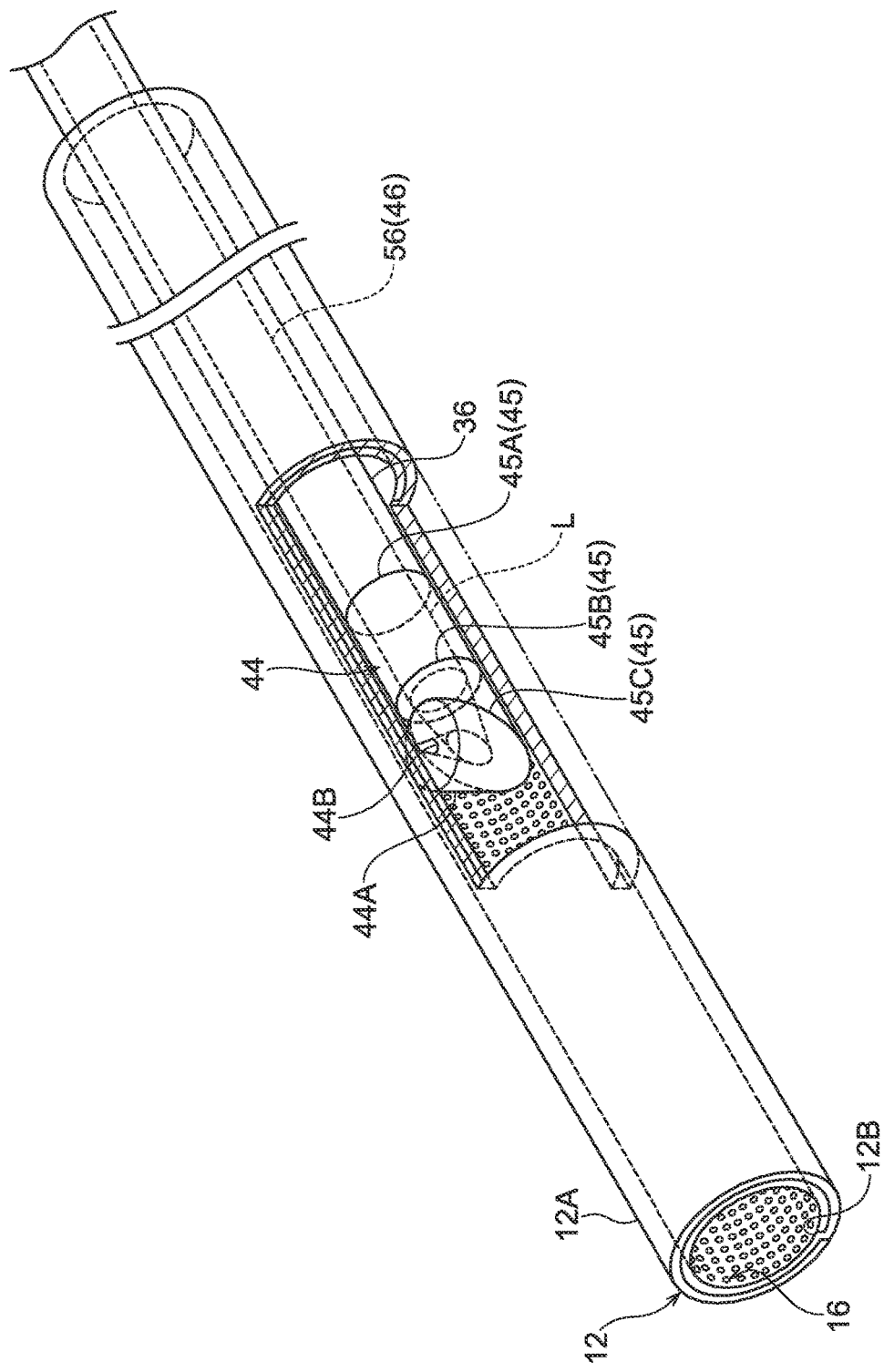
FIG. 4 is an enlarged perspective view in which the part indicated by arrow 4X in FIG. 3 is enlarged.
Figure 5:
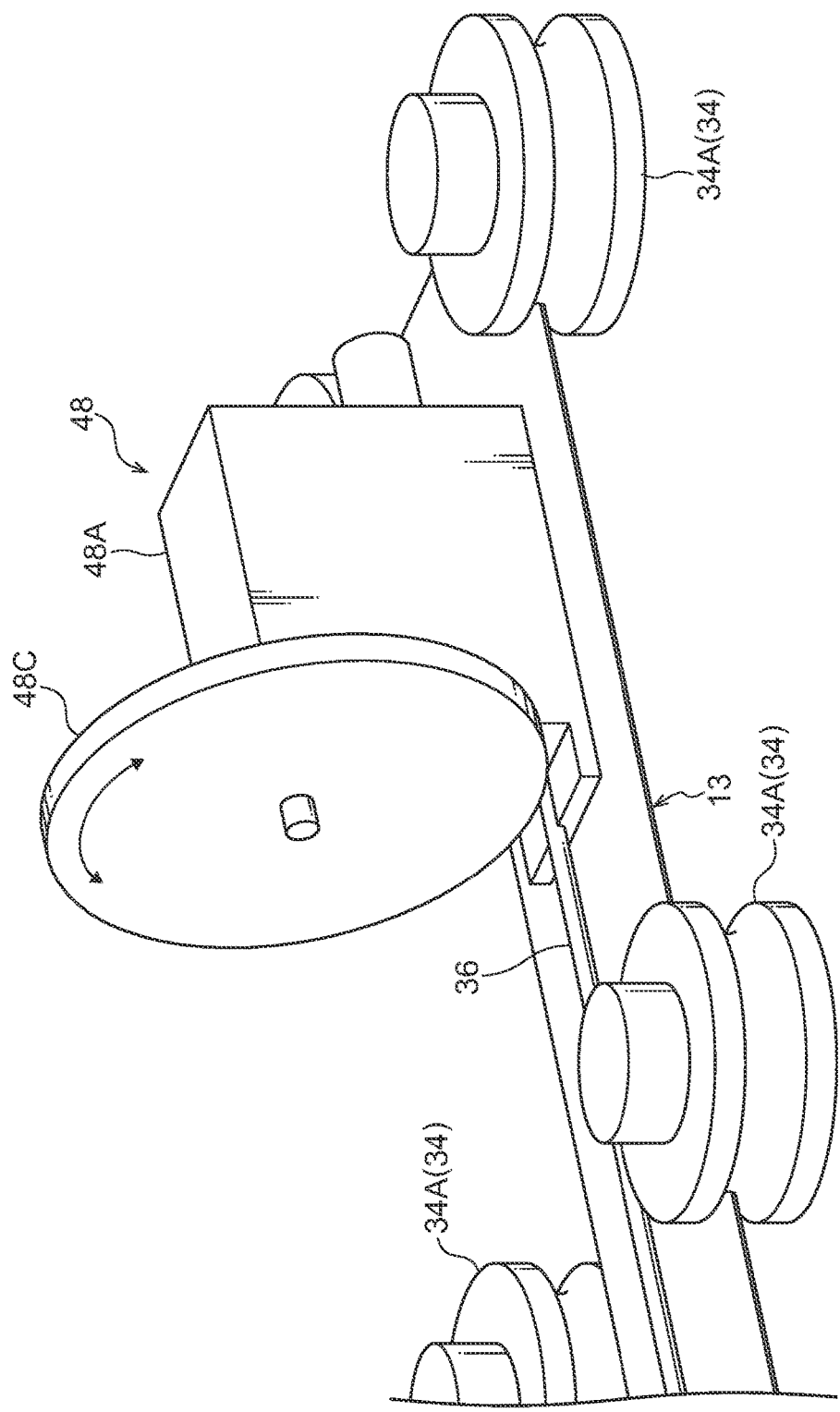
FIG. 5 is an enlarged perspective view in which the part indicated by arrow 5X in FIG. 3 is enlarged.
Figure 6:
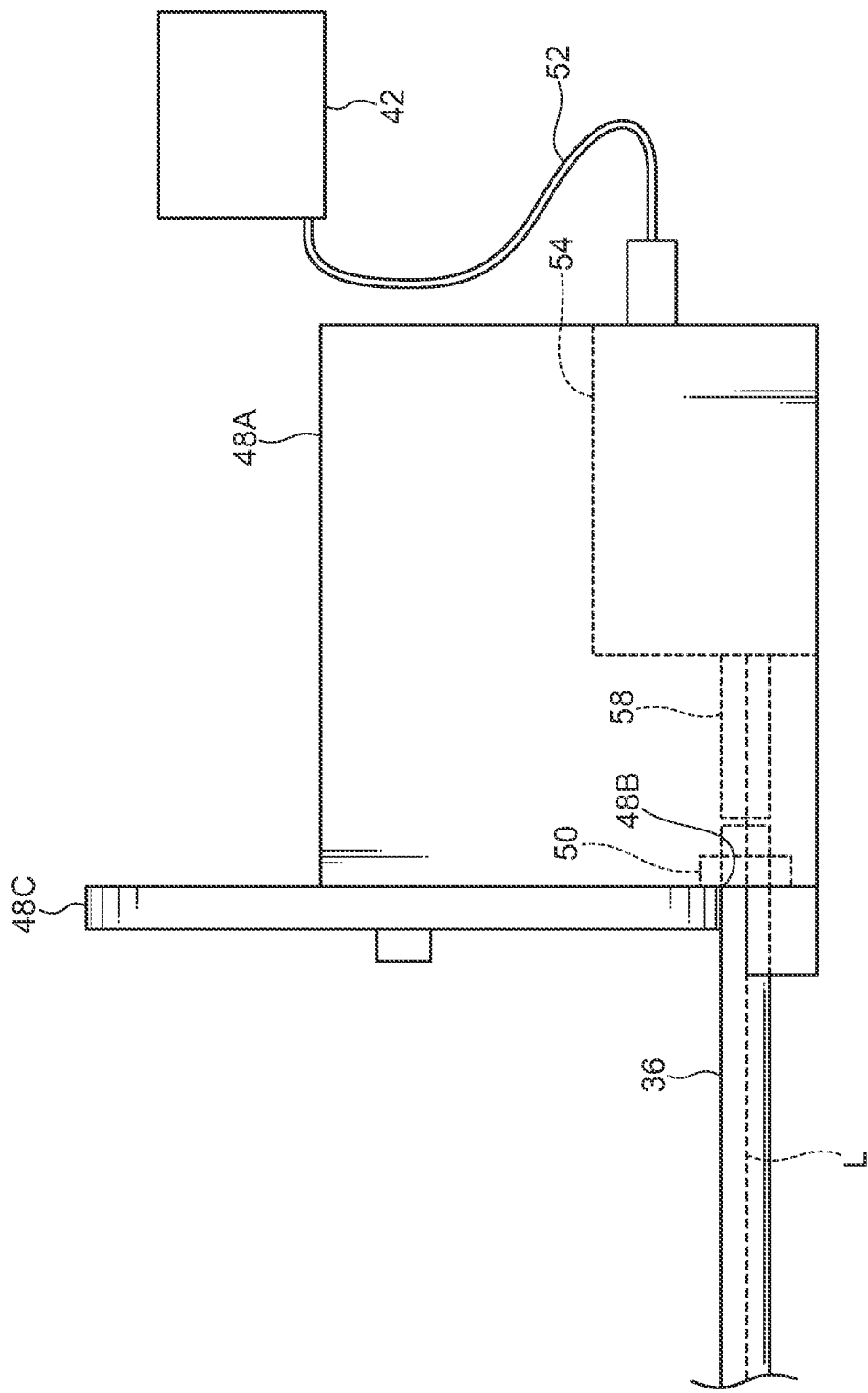
FIG. 6 is a side view showing, from the side, a cored rod rotating device of FIG. 3.

As shown in FIG. 4 to FIG. 6, the laser device 40 is a device that projects a laser L onto the inner surface 12B of the tube body 12 such that the brazing material layer 20 is melted by the heat from the laser L. The laser device 40 is equipped with a laser oscillator 42 that generates the laser L, a laser projecting component 44 that is attached to the distal end portion of the mandrel 36 and projects the laser L toward the inner surface 12B of the tube body 12, and an optical path 46 that interconnects the laser oscillator 42 and the laser projecting component 44.

Furthermore, the laser device 40 of the present embodiment is equipped with a rotating device 48 that causes the mandrel 36 to rotate about its axis (about its axial center). When the mandrel 36 is rotated using the rotating device 48, the laser projecting component 44 attached to the distal end portion of the mandrel 36 rotates together with the mandrel 36. That is, the laser projecting component 44 rotates about the axis of the mandrel 36. By causing the laser projecting component 44 to rotate about the axis of the mandrel 36 in this way, it becomes possible to project the laser L onto the entire inner surface 12B of the tube body 12.

As shown in FIG. 5 and FIG. 6, the rotating device 48 is equipped with a housing 48A, a through hole 48B that is formed in the housing 48A and into which the base end portion of the mandrel 36 is inserted, and a rotating roller 48C that is supported, in such a way that it may freely rotate, on the housing 48A and whose outer peripheral surface is in contact with the mandrel 36.

Inside the housing 48A, a bearing 50 that rotatably supports the base end portion of the mandrel 36 is disposed in a position corresponding to the through hole 48B. Furthermore, disposed inside the housing 48A is a laser receiver 54 to which an optical fiber cable 52 extending from the laser oscillator 42 is connected. An optical fiber 58 extends out from the laser receiver 54 in a position opposing the optical fiber 56 in the mandrel 36 supported by the bearing 50, and the laser L projected from the end face of the optical fiber 58 is made incident from the end face of the optical fiber 56. It will be noted that in the present embodiment the same glass fiber as that of the optical fiber 56 is used as the optical fiber 58.

Furthermore, the mandrel 36 is configured in such a way that rotational force is applied thereto by the rotating roller 48C. Specifically, the outer peripheral surface of the rotating roller 48C is in contact with the outer peripheral surface of the mandrel 36, and when the rotating roller 48C rotates, rotational force is applied to the mandrel 36 because of friction between the outer peripheral surface of the rotating roller 48C and the outer peripheral surface of the mandrel 36. It will be noted that a drive source (e.g., a motor) not shown in the drawings is disposed in the housing 48A, and the rotating roller 48C is configured to rotate using power from the drive source.

As shown in FIG. 4, the laser projecting component 44 has a housing 44A, an optical system 45 that is disposed in the housing 44A and guides to the inner surface 12B of the tube body 12 the laser L emitted from the end face of the optical fiber 56, and a projection opening 44B that is formed in the housing 44A and through which the laser L guided by the optical system 45 passes.

The optical system 45 is equipped with a focusing lens 45A, a collimator lens 45B, and a prism 45C. The focusing lens 45A focuses the laser L emitted from the end face of the optical fiber 56. Next, the collimator lens 45B guides the focused laser L as parallel light to the prism 45C. Then, the prism 45C totally reflects the laser L made into parallel light by the collimator lens 45B and projects the laser L through the projection opening 44B onto the inner surface 12B of the tube body 12.

Furthermore, the optical path 46 of the present embodiment is configured by the optical fiber cable 52, the optical fiber 56, and the optical fiber 58.

Next, the method of manufacturing the multiply-wound tube 10 of the present embodiment will be described.

First, the long metal plate 13 in which the brazing material layer 20 is bonded to the core material layer 18 is prepared, and the metal plate 13 is set in the forming device 32 with one side (the side on which the core material layer 18 is formed) facing up.

Next, the metal plate 13 is wound into a roll around the mandrel 36 by the forming roll group 34. Because of this, the metal plate 13 is roll-formed into the shape of a tube having a predetermined outer diameter such that the tube body 12 is formed.

Figure 7:
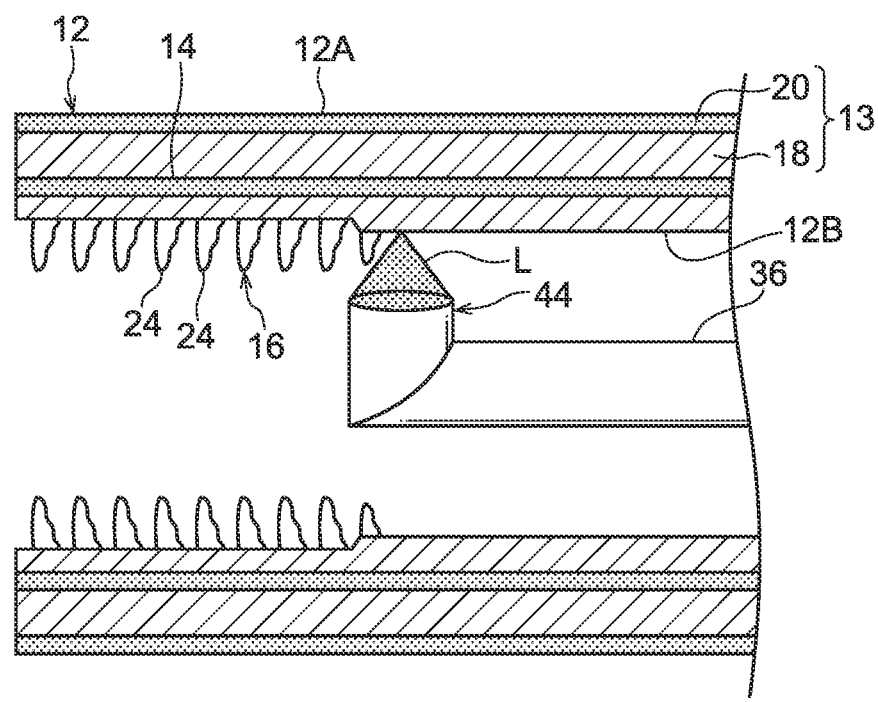
FIG. 7 is a sectional view along an axial direction of a tube body configuring the multiply-wound tube for describing the operation of projecting a laser onto an inner surface of the tube body to form a concavo-convex portion.

Next, as shown in FIG. 7, the laser L oscillated by the laser device 40 is projected onto the inner surface 12B of the tube body 12 such that the core material layer 18 is melted by the heat from the laser L to form the concavo-convex portion 16 in the inner surface 12B, and the brazing material layer 20 is melted by the heat from the laser L transmitted through the core material layer 18, thereby brazing together the portion of the metal plate 13 that is wound in layers.

Figure 11:
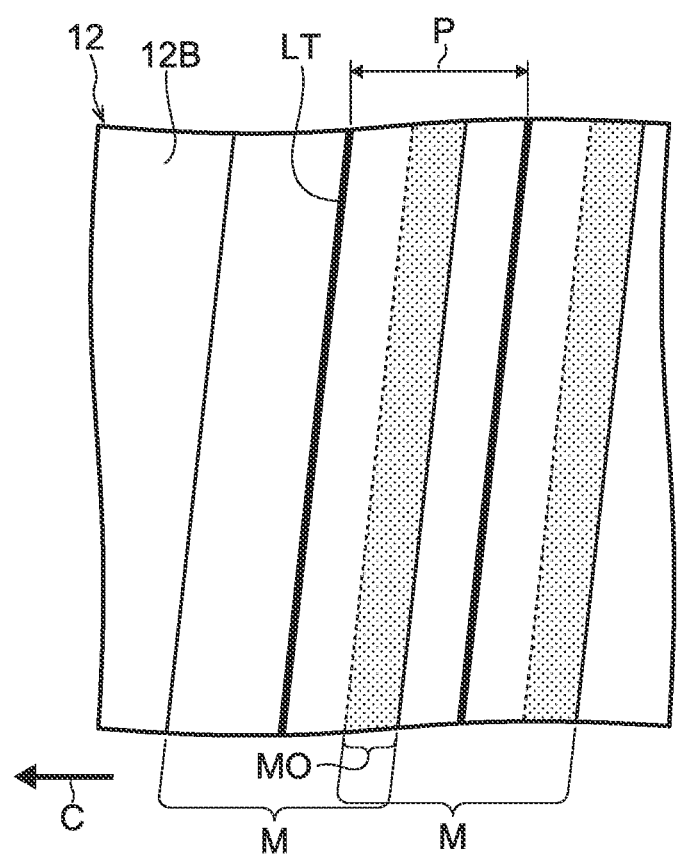
FIG. 11 is a plan view showing an inner periphery of the multiply-wound tube of the first embodiment.

Here, in the present embodiment, the laser L is projected onto the inner surface 12B of the tube body 12 helically about the axial direction of the tube body 12 such that melt regions M of the brazing material layer 20 that become melted by the heat from the laser L overlap each other. Specifically, as shown in FIG. 11, a helical pitch P of a projection track LT (the wide solid lines in FIG. 11) of the laser L is set in such a way that the melt regions M of the brazing material layer 20 that melt centering on the projection track LT overlap each other in the axial direction of the tube body 12 (in other words, in a conveyance direction C of the metal plate 13), whereby the laser L onto the inner surface 12B of the tube body 12 helically such that the melt regions M overlap each other. Because of this, the portion of the metal plate 13 that is wound in layers is entirely brazed together. It will be noted that in FIG. 11 the overlapping sections of the melt regions M are denoted by reference sign MO.

In the present embodiment, the manufacturing device 30 has a configuration where the laser L onto the inner surface 12B of the tube body 12 helically such that the melt regions M overlap each other, but the embodiments of the invention are not limited to this configuration. For example, the manufacturing device 30 may also have a configuration where the laser L onto the inner surface 12B of the tube body 12 helically such that the melt regions M do not overlap each other.

Then, the tube body is cut to a predetermined dimension by a cutting device not shown in the drawings. In this way is the multiply-wound tube 10 manufactured.

Thereafter, the multiply-wound tube 10 is inserted into the through holes 64 in the fins 62 and brazed, whereby the heat exchanger 60 equipped with the multiply-wound tube 10 is formed.

Next, the action and effects of the present embodiment will be described.

In the multiply-wound tube 10, the concavo-convex portion 16 is formed at the inner surface 12B of the tube body 12 at the portion of the core material layer 18 melted by projection of the laser L onto the inner surface 12B. In this way, the multiply-wound tube 10 can efficiently transmit the heat of the fluid (heat medium) flowing inside to the tube body 12, because the surface area of the inner surface 12B is larger compared, for example, to a configuration where the inner surface 12B is flat. That is, the multiply-wound tube 10 has superior heat conductivity.

Furthermore, in the multiply-wound tube 10, the portion of the metal plate 13 that is wound in layers is brazed together by the brazing material layer 20 melted by the heat from the laser L projected onto the tube body 12 formed by winding the metal plate 13 into a roll. Here, in the multiply-wound tube 10, heat from the laser L is used, thereby brazing together the portion of the metal plate 13 that is wound in layers in the tube body 12, so manufacturing costs can be reduced compared, for example, to a configuration where a heating furnace is used, thereby brazing together the portion of the metal plate 13 that is wound in layers in the tube body 12.

In particular, in the multiply-wound tube 10, while the concavo-convex portion 16 is formed by projection of the laser L onto the inner surface 12B of the tube body 12, the portion of the metal plate 13 that is wound in layers is brazed together by the brazing material layer 20 melted by the heat from the laser L transmitted through the core material layer 18, so manufacturing costs can be reduced compared, for example, to a configuration where the step of forming the concavo-convex portion 16 in the inner surface 12B of the tube body 12 and the step of brazing together the portion of the metal plate 13 that is wound in layers is separately carried out.

Furthermore, in the method of manufacturing the multiply-wound tube 10, the laser L onto the tube body 12 helically such that the melt regions M of the brazing material layer 20 overlap each other, so the portion of the metal plate 13 that is wound in layers is entirely brazed together. Furthermore, in the method of manufacturing the multiply-wound tube 10, the manufacturing time can be shortened compared, for example, to a configuration where the laser L is repeatedly projected multiple times along the axial direction of the tube body 12 to entirely braze together the portion of the metal plate 13 that is wound in layers.

In the method of manufacturing the multiply-wound tube 10, the laser L is projected onto the inner surface 12B of the tube body 12 wound into a roll to form the concavo-convex portion 16, so compared, for example, to a configuration where the tube body is formed by winding into a roll the metal plate 13 in which the concavo-convex portion 16 has been formed beforehand, the concavo-convex portion 16 does not become crushed when the tube body is wound into a roll, or in other words the concavo-convex portion 16 in which there is little deformation can be stably formed at the inner surface 12B of the tube body 12.

Furthermore, in the method of manufacturing the multiply-wound tube 10, the laser L is projected onto the inner surface 12B of the tube body 12 to form the concavo-convex portion 16, so the degree of freedom with which the concavo-convex portion 16 may be designed is high. For this reason, in the multiply-wound tube 10, the effectiveness of heat transfer between the fluid and the multiply-wound tube 10 can be further enhanced by adjusting the shape and pattern of the concavo-convex portion 16.

Furthermore, in the manufacturing device 30, the laser projecting component 44 is provided at the distal end portion of the mandrel 36 around which the metal plate 13 is wound into a roll, so the relative positions of the laser projecting component 44 and the tube body 12 are stable.

Moreover, in the manufacturing device 30, the laser projecting component 44 rotates about the axis of the mandrel 36 and projects the laser L onto the inner surface 12B of the tube body 12, so compared, for example, to a configuration where the laser projecting portion 44 is not rotated but rather plural projection openings 44B are formed in the laser projecting component 44 and the laser L is projected in plural directions, it becomes possible to project, with a simple configuration, the laser L all the way around the inner surface 12B of the tube body 12. Because the concavo-convex portion 16 is formed all the way around the inner surface 12B of the tube body 12 in this way, the heat transfer performance of the multiply-wound tube 10 is further improved.

Furthermore, in the present embodiment, the metal plate 13 is configured by aluminum, so the weight of the multiply-wound tube 10 can be reduced and the cost of the multiply-wound tube 10 can be reduced while ensuring the thermal conductivity of the multiply-wound tube 10.

In the first embodiment, the multiply-wound tube 10 has a configuration where the core material layer 18 forms the inner surface 12B of the tube body 12 and where the concavo-convex portion 16 is formed in part of the core material layer 18, but the embodiments of the invention are not limited to this configuration. For example, the multiply-wound tube 10 may also have a configuration where the brazing material layer 20 forms the inner surface 12B of the tube body 12 and where the concavo-convex portion 16 is formed in part of the brazing material layer 20. It will be noted that the configuration where the concavo-convex portion 16 is formed in part of the brazing material layer 20 forming the inner surface 12B of the tube body 12 may also be applied to the third embodiment described later.

Second Embodiment

Next, a multiply-wound tube and a method of manufacturing a multiply-wound tube pertaining to a second embodiment of the invention will be described. It will be noted in regard to configurations identical to those in the first embodiment that identical reference signs are assigned thereto and description thereof will be omitted.

Figure 8:
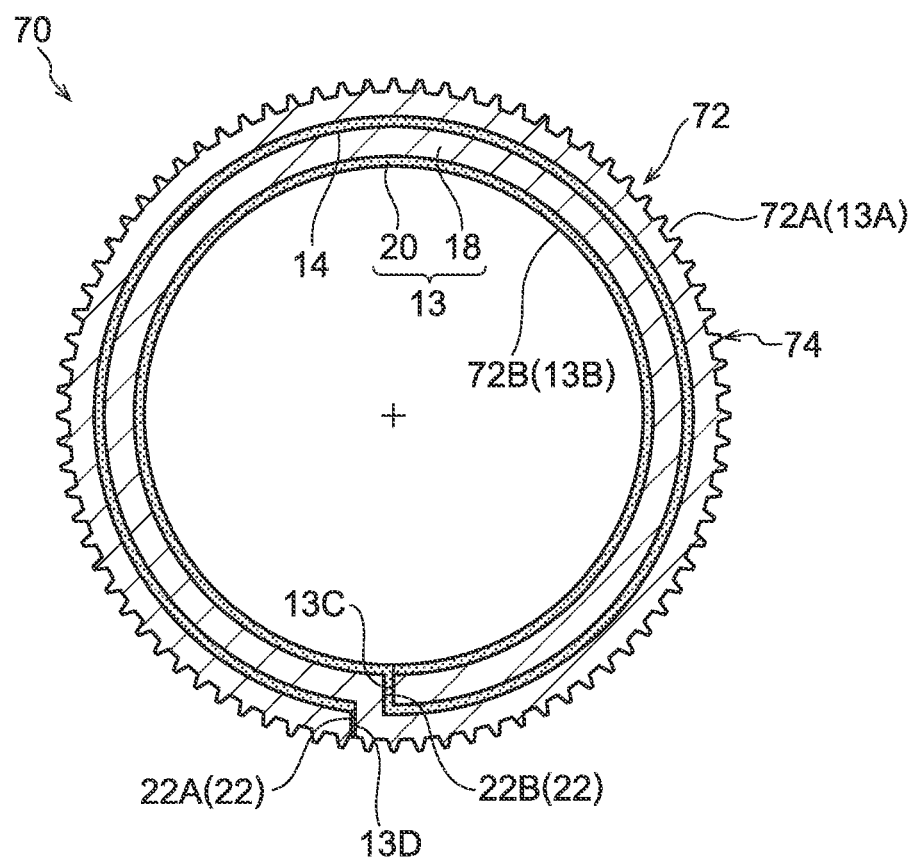
FIG. 8 is a sectional view along a direction perpendicular to an axis of a multiply-wound tube of a second embodiment.

As shown in FIG. 8, a multiply-wound tube 70 of the present embodiment is identical in configuration to the multiply-wound tube 10 of the first embodiment except for the configurations of a tube body 72 and a concavo-convex portion 74.

An outer surface 72A of the tube body 72 is formed by the core material layer 18, and an inner surface 72B of the tube body 72 is formed by the brazing material layer 20. Furthermore, the concavo-convex portion 74 is formed at the outer surface 72A of the tube body 72 at the portion of the core material layer 18 melted by projection of the laser L onto the outer surface 72A. The configuration of the concavo-convex portion 74 may be the same as, or different from, the configuration of the concavo-convex portion 16 of the first embodiment.

Next, the method of manufacturing the multiply-wound tube 70 of the present embodiment will be described.

First, the tube body 72 is formed by winding the metal plate 13 into a roll such that the core material layer 18 forms the outer surface 72A of the tube body 72.

Next, the laser L is projected onto the outer surface 72A of the tube body 72 such that the core material layer 18 is melted by the heat from the laser L to form the concavo-convex portion 74 in the outer surface 72A, and the brazing material layer 20 is melted by the heat from the laser L transmitted through the core material layer 18, thereby brazing together the portion of the metal plate 13 that is wound in layers.

Then, the tube body 72 is cut to a predetermined dimension by a cutting device not shown in the drawings. In this way the multiply-wound tube 70 manufactured.

It will be noted that the concavo-convex portion 74 can be formed at the outer surface 72A of the tube body 72 by using a laser device equipped with a laser projecting component that rotates about the tube body 72, for example.

Next, the action and effects of the present embodiment will be described.

In the multiply-wound tube 70, the concavo-convex portion 74 is formed at the outer surface 72A of the tube body 72 at the portion of the core material layer 18 melted by projection of the laser L onto the outer surface 72A, so the heat of the fluid (heat medium) flowing inside the tube body 72 can be efficiently released via the tube body 72 to the outside.

Furthermore, in the method of manufacturing the multiply-wound tube 70, the laser L is projected onto the outer surface 72A of the tube body 72 such that the core material layer 18 is melted by the heat from the laser L to form the concavo-convex portion 74 in the outer surface 72A of the tube body 72, and the brazing material layer 20 is melted by the heat from the laser L transmitted through the core material layer 18, thereby brazing together the portion of the metal plate 13 that is wound in layers. For this reason, in the method of manufacturing the multiply-wound tube 70, manufacturing costs can be reduced compared, for example, to a configuration where the step of forming the concavo-convex portion 74 in the outer surface 72A of the tube body 72 and the step of brazing together the portion of the metal plate 13 that is wound in layers is separately carried out.

In the second embodiment, the multiply-wound tube 70 has a configuration where the core material layer 18 forms the outer surface 72A of the tube body 72 and where the concavo-convex portion 74 is formed in part of the core material layer 18, but the embodiments of the invention are not limited to this configuration. For example, the multiply-wound tube 70 may also have a configuration where the brazing material layer 20 forms the outer surface 72A of the tube body 72 and where the concavo-convex portion 74 is formed by part of the brazing material layer 20. It will be noted that the configuration where the concavo-convex portion 74 is formed by part of the brazing material layer 20 forming the outer surface 72A of the tube body 72 may also be applied to the fourth embodiment described later.

Third Embodiment

Next, a multiply-wound tube and a method of manufacturing a multiply-wound tube pertaining to a third embodiment of the invention will be described. It will be noted in regard to configurations identical to those in the first embodiment that identical reference signs are assigned thereto and description thereof will be omitted.

Figure 9:
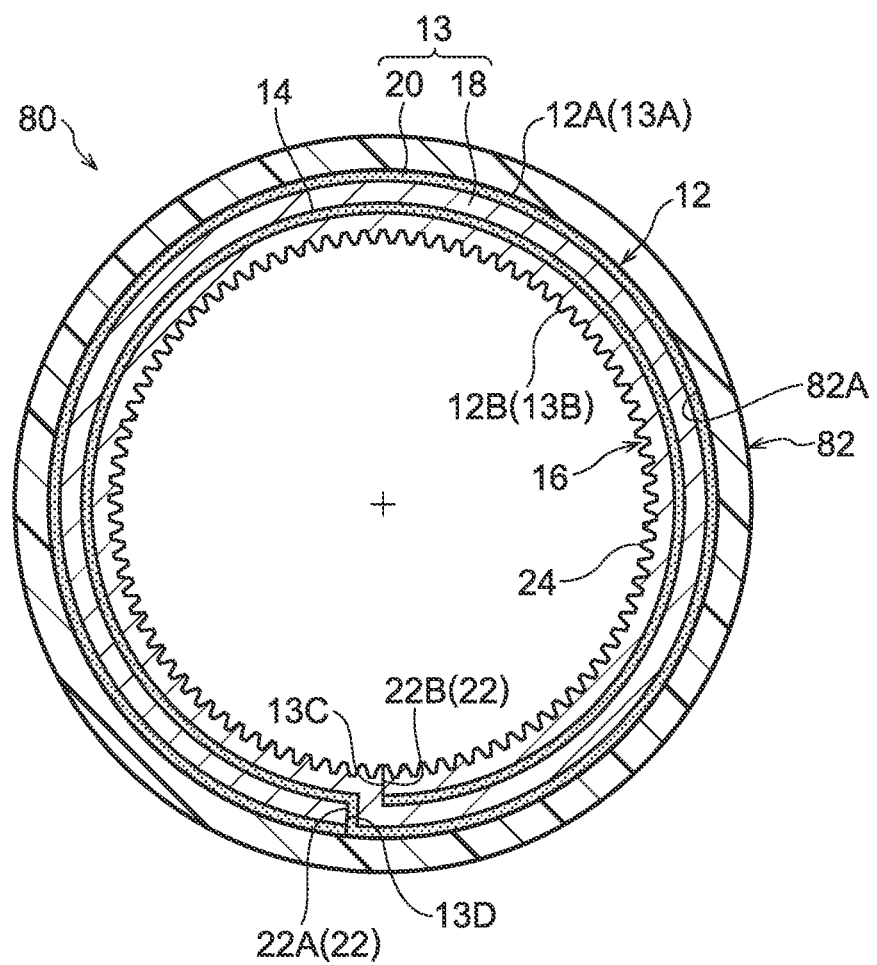
FIG. 9 is a sectional view along a direction perpendicular to an axis of a multiply-wound tube of a third embodiment.

As shown in FIG. 9, a multiply-wound tube 80 of the present embodiment is identical in configuration to the multiply-wound tube 10 of the first embodiment except for the configuration of a cover member 82. It will be noted that the multiply-wound tube 80 of the present embodiment is used as a pipe in an automobile, for example.

The outer surface 12A of the tube body 12 of the multiply-wound tube 80 of the present embodiment is covered with a cover member 82 made of a resin material. The cover member 82 is made of a heat-shrinkable material and is adhered to the outer surface 12A as a result of a contact surface 82A of the cover member 82 in contact with the tube body 12 being melted by the heat generated by projection of the laser L onto the inner surface 12B of the tube body 12.

Next, the method of manufacturing the multiply-wound tube 80 of the present embodiment will be described.

First, the tube body 12 is formed by winding the metal plate 13 into a roll such that the core material layer 18 forms the inner surface 12B of the tube body 12.

Next, the tube body 12 is covered with the cover member 82. Specifically, the tube body 12 is inserted inside the tubular cover member 82.

Next, the laser L is projected onto the inner surface 12B of the tube body 12 such that the core material layer 18 is melted by the heat from the laser L to form the concavo-convex portion 16 in the inner surface 12B, and the brazing material layer 20 is melted by the heat from the laser L transmitted through the core material layer 18, thereby brazing together the portion of the metal plate 13 that is wound in layers. At this time, the cover member 82 is heat-shrunk by heat from the laser L transmitted through the metal plate 13 such that the inner periphery of the cover member 82 and the outer periphery of the tube body 12 are brought into tight contact with each other, and furthermore the contact surface 82A of the contact member 82 in contact with the tube body 12 is melted by the heat from the laser L such that the cover member 82 and the outer surface 12A of the tube body 12 are adhered to each other.

Then, together with the cover member 82 the tube body 12 is cut to a predetermined dimension by a cutting device not shown in the drawings. In this way is the multiply-wound tube 80 manufactured.

Next, the action and effects of the present embodiment will be described.

In the multiply-wound tube 80, the outer surface 12A of the tube body 12 is covered with the cover member 82, so the durability of the tube body 12 is improved compared, for example, to a configuration where the outer surface 12A of the tube body 12 is exposed to the outside. Furthermore, the contact surface 82A of the cover member 82 is melted by the heat generated by projection of the laser L onto the inner surface 12B of the tube body 12 such that the cover member 82 and the outer surface 12A of the tube body 12 are adhered to together, so the strength of adhesion between the cover member 82 and the tube body 12 is improved.

Furthermore, in the method of manufacturing the multiply-wound tube 80, while the laser L is projected onto the inner surface 12B of the tube body 12 to form the concavo-convex portion 16, the brazing material layer 20 is melted by the heat from the laser L such that the portion of the metal plate 13 that is wound in layers is joined to each other by brazing, and furthermore the contact surface 82A of the cover member 82 in contact with the tube body 12 is melted by the heat from the laser L transmitted through the metal plate 13 such that the cover member 82 and the outer surface 12A of the tube body 12 are adhered to together. For this reason, in the method of manufacturing the multiply-wound tube 80, manufacturing costs can be reduced compared, for example, to a configuration where the step of brazing together the portion of the metal plate 13 that is wound in layers in the tube body 12 and the step of adhering the cover member 82 to the outer surface 12A of the tube body 12 using an adhesive are separately carried out.

In the manufacturing method of the third embodiment, the tube body 12 is inserted inside the tubular cover member 82, but the embodiments of the invention are not limited to this configuration. For example, the method may also have a configuration where a single strip-like cover member 82 is wound around the tube body 12 in such a way that the width direction end portions of the cover member 82 face each other or overlap each other such that the tube body 12 is covered with the cover member 82, and the method may also have a configuration where a single strip-like cover member 82 is helically wound around the tube body 12 in such a way that the width direction end portions of the cover member 82 face each other or overlap each other such that the tube body 12 is covered with the cover member 82. The above methods of winding the cover member 82 around the tube body 12 may also be applied to the fourth embodiment described later.

Furthermore, in the manufacturing method of the third embodiment, the method has a configuration where the laser L is projected onto the inner surface 12B of the tube body 12 after the tube body 12 has been inserted inside the tubular cover member 82, that is, after the tube body 12 has been covered with the cover member 82, but the embodiments of the invention are not limited to this configuration. For example, the method may also have a configuration where the tube body 12 is inserted inside the tubular cover member 82 to cover the tube body 12 with the cover member 82 while the laser L is projected onto the inner surface 12B of the tube body 12. In this case also, the cover member 82 can be adhered to the outer surface 12A by residual heat generated by projection of the laser L onto the inner surface 12B of the tube body 12. It will be noted that the configuration where the tube body 12 and the cover member 82 are adhered to together by residual heat generated by projection of the laser L may also be applied to the above method where a single strip-like cover member 82 is wound around the tube body 12 in such a way that the width direction end portions of the cover member 82 face each other or overlap each other and the above method where a single strip-like cover member 82 is helically wound around the tube body 12 in such a way that the width direction end portions of the cover member 82 face each other or overlap each other, and may also be applied to the fourth embodiment described later.

Fourth Embodiment

Next, a multiply-wound tube and a method of manufacturing a multiply-wound tube pertaining to a fourth embodiment of the invention will be described. It will be noted in regard to configurations identical to those in the second embodiment that identical reference signs are assigned thereto and description thereof will be omitted.

Figure 10:
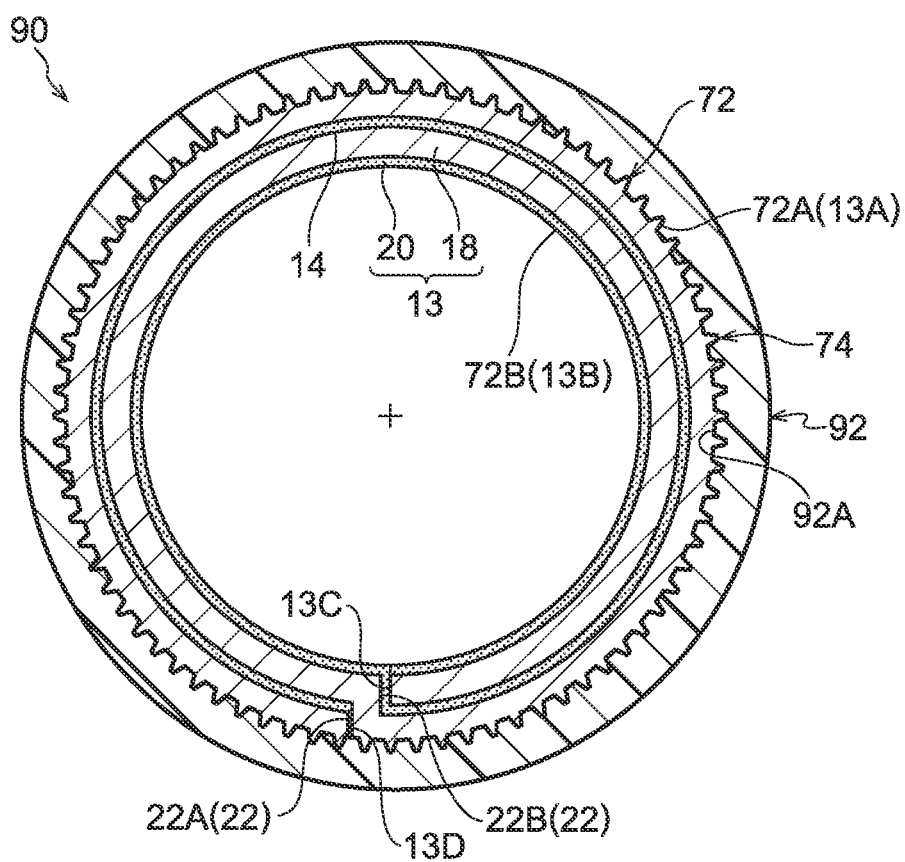
FIG. 10 is a sectional view along a direction perpendicular to an axis of a multiply-wound tube of a fourth embodiment.

As shown in FIG. 10, a multiply-wound tube 90 of the present embodiment is identical in configuration to the multiply-wound tube 70 of the second embodiment except for the configuration of a cover member 92. It will be noted that the multiply-wound tube 90 of the present embodiment is used as a pipe in an automobile, for example.

The outer surface 72A of the tube body 72 of the multiply-wound tube 90 of the present embodiment is covered with a cover member 92 made of a resin material (having the same configuration as the cover member 82 of the third embodiment). The cover member 92 is adhered to the outer surface 72A of the tube body 72 as a result of a contact surface 92A of the cover member 92 in contact with the tube body 72 being melted by the heat generated by projection of the laser L onto the inner surface 72B of the tube body 72.

Next, the method of manufacturing the multiply-wound tube 90 of the present embodiment will be described.

First, the tube body 72 is formed by winding the metal plate 13 into a roll such that the core material layer 18 forms the outer surface 72A of the tube body 72.

Next, the laser L is projected onto the outer surface 72A of the tube body 72 such that the core material layer 18 is melted by the heat from the laser L to form the concavo-convex portion 74 in the outer surface 72A, and the brazing material layer 20 is melted by the heat from the laser L transmitted through the core material layer 18, thereby brazing together the portion of the metal plate 13 that is wound in layers.

Next, the tube body 72 is covered with the cover member 92. Specifically, the tube body 72 is inserted inside the tubular cover member 92.

Then, the laser L is projected onto the inner surface 72B of the tube body 72 such that the cover member 92 is heat-shrunk by heat from the laser L transmitted through the metal plate 13 and the inner periphery of the cover member 92 and the outer periphery of the tube body 72 are brought into tight contact with each other, and furthermore the contact surface 92A of the cover member 92 in contact with the tube body 72 is melted by the heat from the laser L such that the cover member 92 and the outer surface 72A are adhered to together.

Then, together with the cover member 92 the tube body 72 is cut to a predetermined dimension by a cutting device not shown in the drawings. In this way is the multiply-wound tube 90 manufactured.

Next, the action and effects of the present embodiment will be described.

In the multiply-wound tube 90, the outer surface 72A of the tube body 72 is covered with the cover member 92, so the durability of the tube body 72 is improved compared, for example, to a configuration where the outer surface 72A of the tube body 72 is exposed to the outside. Furthermore, the contact surface 92A of the cover member 92 is melted by the heat generated by projection of the laser L onto the inner surface 72B of the tube body 72 such that the cover member 92 and the outer surface 72A of the tube body 72 (including the concavo-convex portion 74) are adhered to together, so the strength of adhesion between the cover member 92 and the tube body 72 is further improved by an anchor effect.

Furthermore, in the method of manufacturing the multiply-wound tube 90, first the outer surface 72A of the tube body 72 in which the concavo-convex portion 74 has been formed is covered with the cover member 92. Next, the laser L is projected onto the inner surface 72B of the tube body 72 such that the contact surface 92A of the cover member 92 in contact with the tube body 72 is melted by the heat from the laser L transmitted through the metal plate 13 and the cover member 92 and the outer surface 72A of the tube body 72 are adhered to together. For this reason, in the method of manufacturing the multiply-wound tube 90, manufacturing costs can be reduced compared, for example, to a configuration where the step of applying an adhesive to the outer surface 72A of the tube body 72 and the step of adhering the cover member 92 to the outer surface 72A of the tube body 72 using the applied adhesive are separately carried out.

In the manufacturing method of the fourth embodiment, the laser L is projected onto the outer surface 72A of the tube body 72 to form the concavo-convex portion 74 in the outer surface 72A, thereafter the tube body 72 is covered with the cover member 92, and thereafter the laser L is projected onto the inner surface 72B of the tube body 72 such that the cover member 92 and the tube body 72 are adhered to together by heat from the laser L, but the embodiments of the invention are not limited to this configuration. For example, the method may also have a configuration where, while the laser L is projected onto the outer surface 72A of the tube body 72 to form the concavo-convex portion 74 in the outer surface 72A, the tube body 72 is covered with the cover member 92 and the cover member 92 and the tube body 72 are adhered to together by residual heat generated by projection of the laser L onto the metal plate 13.

In the first embodiment, the method has a configuration where, while the laser L is projected onto the inner surface 12B of the tube body 12 to form the concavo-convex portion 16, the portion of the metal plate 13 that is wound in layers is brazed together by heat from the laser L, but the embodiments of the invention are not limited to this configuration. The method may also have a configuration where the laser L is projected onto the inner surface 12B of the tube body 12 such that the portion of the metal plate 13 that is wound in layers is just brazed together by heat from the laser L but the concavo-convex portion 16 is not formed. The above configuration where the portion of the metal plate 13 that is wound in layers is just brazed together may also be applied to the second embodiment, the third embodiment, and the fourth embodiment.

Modes of implementing the invention have been described above by way of embodiments, but these embodiments are examples and can be changed and implemented in a variety of ways to the extent that they do not depart from the gist of the invention. Furthermore, it goes without saying that the scope of rights of the invention is not limited to these embodiments.

All documents, patent applications, and technical standards mentioned in this specification are incorporated by reference herein to the same extent as if each individual document, patent application, or technical standard were specifically and individually indicated to be incorporated by reference.

REFERENCE SIGNS LIST 10, 70, 80, 90 Multiply-Wound Tube
12, 72 Tube Body
12A, 72A Outer Surface
12B, 72B Inner Surface
13 Metal Plate
14 Joint Portion
16 Concavo-convex Portion
18 Core Material Layer
20 Brazing Material Layer
30 Manufacturing Device
32 Forming Device
36 Mandrel (Cored Rod)
40 Laser Device
44 Laser Projecting Component
74 Concavo-convex Portion
82 Cover Member
82A Contact Surface
92 Cover Member
92A Contact Surface
L Laser

The invention claimed is:

1. A multiply-wound tube, comprising:
a tube body formed by winding, into a roll, a metal plate comprising a core material layer made of a first metal material and a brazing material layer made of a second metal material having a lower melting point than the core material layer; and
a joint portion that is formed at a portion of the metal plate that is wound in layers, wherein the portion of the metal plate that is wound in layers is brazed together by the brazing material layer being melted by heat from a laser projected onto the tube body.

2. The multiply-wound tube according to claim 1, wherein:
the laser is helically projected onto the tube body, and
the portion of the metal plate that is wound in layers is entirely brazed together.

3. The multiply-wound tube according to claim 1, wherein a concavo-convex portion is formed at an inner surface or an outer surface of the tube body by the laser.

4. The multiply-wound tube according to claim 3, wherein:
the core material layer forms the inner surface of the tube body, and
the concavo-convex portion is formed at the inner surface at a portion of the core material layer that is melted by projection of the laser onto the inner surface.

5. The multiply-wound tube according to claim 3, wherein:
the core material layer forms the outer surface of the tube body, and
the concavo-convex portion is formed at the outer surface at a portion of the core material layer that is melted by projection of the laser onto the outer surface.

6. The multiply-wound tube according to claim 1, wherein:
an outer surface of the tube body is covered with a cover member made of a resin material, and
the cover member is adhered to the outer surface as a result of a contact surface of the cover member in contact with the tube body being melted by heat from the laser projected onto the tube body.

7. A method of manufacturing a multiply-wound tube, the method comprising:
forming a tube body by winding, into a roll, a metal plate comprising a core material layer made of a first metal material and a brazing material layer made of a second metal material having a lower melting point than the core material layer; and
projecting a laser onto the tube body such that the brazing material layer is melted by heat from the laser, thereby brazing together a portion of the metal plate that is wound in layers.

8. The method of manufacturing a multiply-wound tube according to claim 7, further comprising projecting the laser onto the tube body helically such that regions of the brazing material layer melted by heat from the laser overlap each other.

9. The method of manufacturing a multiply-wound tube according to claim 7, further comprising projecting the laser onto the tube body so as to form a concavo-convex portion at an inner surface or an outer surface of the tube body.

10. The method of manufacturing a multiply-wound tube according to claim 9, further comprising:
forming the tube body by winding the metal plate into a roll such that the core material layer forms the inner surface of the tube body; and
projecting the laser onto the inner surface such that the core material layer is melted by heat from the laser to form the concavo-convex portion at the inner surface, and the brazing material layer is melted by heat from the laser transmitted through the core material layer, thereby brazing together the portion of the metal plate that is wound in layers.

11. The method of manufacturing a multiply-wound tube according to claim 9, further comprising:
forming the tube body by winding the metal plate into a roll such that the core material layer forms the outer surface of the tube body; and
projecting the laser onto the outer surface such that the core material layer is melted by heat from the laser to form the concavo-convex portion at the outer surface, and the brazing material layer is melted by heat from the laser transmitted through the core material layer, thereby brazing together the portion of the metal plate that is wound in layers.

12. The method of manufacturing a multiply-wound tube according to claim 7, wherein the laser is projected onto the tube body after an outer surface of the tube body has been covered, or while the outer surface of the tube body is being covered, with a cover member made of a resin material, such that the brazing material layer is melted by heat from the laser, thereby brazing together the portion of the metal plate that is wound in layers, and a contact surface of the cover member in contact with the tube body is melted by heat from the laser transmitted through the metal plate such that the cover member and the outer surface are adhered together.

13. A device for manufacturing a multiply-wound tube, the device comprising:
a forming device that forms a tube body by winding, into a roll, a metal plate comprising include a core material layer made of a first metal material and a brazing material layer made of a second metal material having a lower melting point than the core material layer; and a laser device that projects a laser onto the tube body to melt the brazing material layer with heat from the laser.

14. The device for manufacturing a multiply-wound tube according to claim 13, wherein:

the forming device is equipped with a cylindrical cored rod around which the metal plate is wound into a roll, and the laser device is equipped with a laser projecting component that is provided at a distal end portion side of the cored rod and projects the laser onto an inner surface of the tube body.

15. The device for manufacturing a multiply-wound tube according to claim 14, wherein the laser projecting component rotates about an axis of the cored rod and projects the laser onto the inner surface of the tube body.

\* \* \* \* \*